(12) United States Patent
Zhang et al.

(10) Patent No.: US 9,613,552 B2
(45) Date of Patent: Apr. 4, 2017

(54) INSPECTION INSTRUMENT OF LIQUID CRYSTAL DISPLAY PANEL

(71) Applicant: Shenzhen China Star Optoelectronics Technology Co., Ltd., Shenzhen, Guangdong (CN)

(72) Inventors: Shucheng Zhang, Guangdong (CN); Hao Huang, Guangdong (CN); Zhiming Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 309 days.

(21) Appl. No.: 14/384,637

(22) PCT Filed: Jun. 25, 2013

(86) PCT No.: PCT/CN2013/077931
§ 371 (c)(1),
(2) Date: Sep. 11, 2014

(87) PCT Pub. No.: WO2014/146367
PCT Pub. Date: Sep. 25, 2014

(65) Prior Publication Data
US 2016/0240121 A1    Aug. 18, 2016

(30) Foreign Application Priority Data

Mar. 20, 2013   (CN) .......................... 2013 1 0091483

(51) Int. Cl.
G01R 31/14        (2006.01)
G01B 7/14         (2006.01)
(Continued)

(52) U.S. Cl.
CPC ....... *G09G 3/006* (2013.01); *G02F 1/136286* (2013.01); *G09G 5/36* (2013.01); *G02F 2001/136254* (2013.01)

(58) Field of Classification Search
CPC ...................... G09G 3/006; G09G 5/36; G02F 2001/136254; G02F 1/136286
(Continued)

(56) References Cited

U.S. PATENT DOCUMENTS

2013/0140953 A1*  6/2013  Miyazawa .......... H01L 41/0906
                                                        310/330

* cited by examiner

*Primary Examiner* — Farhana Hoque
(74) *Attorney, Agent, or Firm* — Andrew C. Cheng (57) ABSTRACT

The present invention provides an inspection instrument of a liquid crystal display panel, comprising an inspection equipment and an image generator electrically connected to the inspection equipment, and the inspection equipment comprises a main body, a first test arm and a second test arm which are installed on the main body and electrically connected to the image generator, a plurality of first contact probes and a plurality of second contact probes which are respectively installed on the first test arm and the second test arm, and a first bonding part and a second bonding part which are respectively and slidably installed on the first test arm and the second test arm, and the first contact probes and the second contact probes are electrically connected to the image generator, and first conductors and second conductors are respectively located on the first bonding part and the second bonding part, and the first conductors and the second conductors are electrically connected to the image generator, and the first conductors and the second conductors are positionally adjustable in the direction perpendicular to the liquid crystal display panel. According to the present invention, the switch between the two types of light-on Inspection, Shorting Bar and 1D1G can be done only by adjust-
(Continued)

ment of the position of the conductors of the bonding parts relative to the liquid crystal display panel. The replacement of the test means used in the inspection instrument is not required.

17 Claims, 8 Drawing Sheets

(51) Int. Cl.
    *H01L 41/00*     (2013.01)
    *G09G 3/00*     (2006.01)
    *G02F 1/1362*     (2006.01)
    *G09G 5/36*     (2006.01)

(58) Field of Classification Search
    USPC .............................. 324/760.02, 509, 207.15
    See application file for complete search history.

INSPECTION INSTRUMENT OF LIQUID CRYSTAL DISPLAY PANEL

FIELD OF THE INVENTION

The present invention relates to a display skill field, and more particularly to an inspection instrument of a liquid crystal display panel.

BACKGROUND OF THE INVENTION

A flat panel display possesses advantages of being ultra thin, power saved and radiation free. It has been widely utilized. Most of LCDs in the present market are backlight type LCDs which include a liquid crystal display panel and a backlight module. The working theory of the liquid crystal display panel is to position liquid crystal molecules between two parallel glass substrates. By conducting the circuits of the glass substrates to control the liquid crystal molecules to change the directions to refract out the light of the backlight module for generating images.

Figure 1:
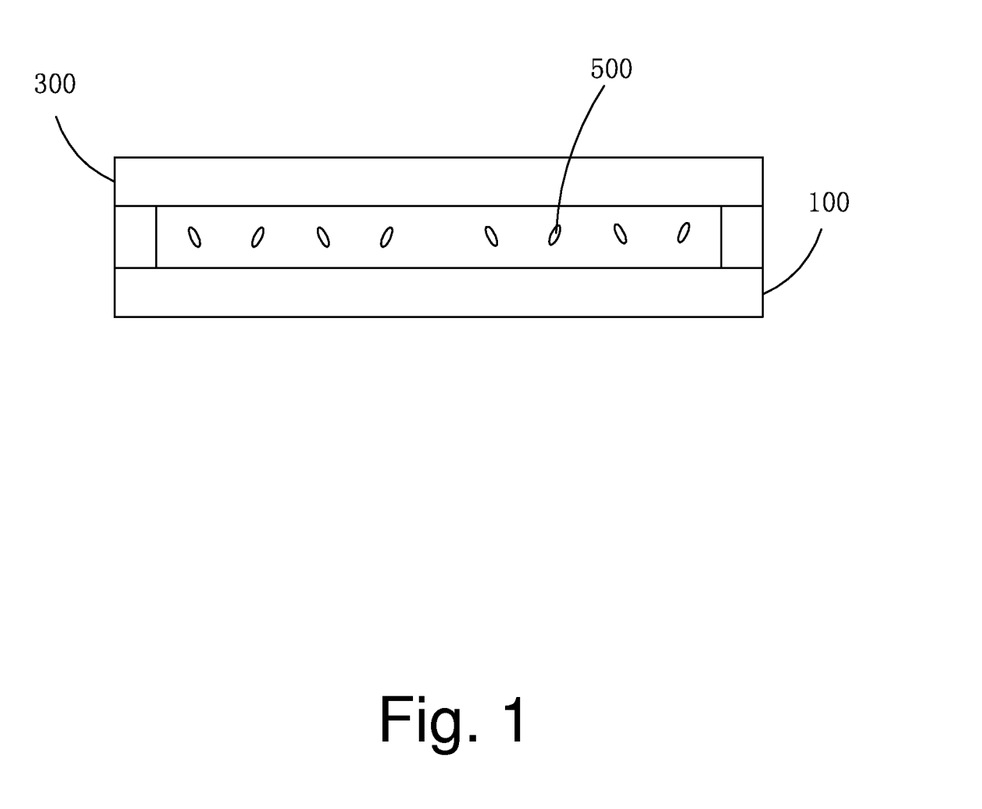
FIG. 1 is a structural diagram of a liquid crystal display panel according to prior art.

Please refer to FIG. 1, and the liquid crystal display panel generally comprises: a thin film transistor (TFT) substrate 100, color film (CF) substrate 300 which is oppositely laminated with the TFT substrate 100 and liquid crystal 500 positioned between the TFT substrate 100 and the CF substrate 300. After accomplishing the manufacture of the liquid crystal display panel with laminations of the TFT substrate 100 and the CF substrate 300 and before assembling the liquid crystal display panel as one liquid crystal display device, the liquid crystal display panel requires light-on inspection for testing whether defaults of bad dots (MURA) or light dots (DOT/LINE) exist or not. There are two present light-on Inspections for the liquid crystal display panel. One is Shorting Bar light-on Inspection and the other is 1D1G (1 Data 1 Gate) light-on Inspection. The Shorting Bar can generate respective gray level images of red (R), green (G), blue (B), black and white. The 1D1G can generate respective gray level images of black and white. In the initial stage of the liquid crystal display panel inspection, the Shorting Bar light-on Inspection is utilized. The terminals of the Shorting Bar are cut off and bonding process is executed after the Shorting Bar light-on Inspection is completed. For testing the image status of the liquid crystal display panel after the terminals of the Shorting Bar are cut off, the 1D1G light-on Inspection is now utilized.

Figure 2:
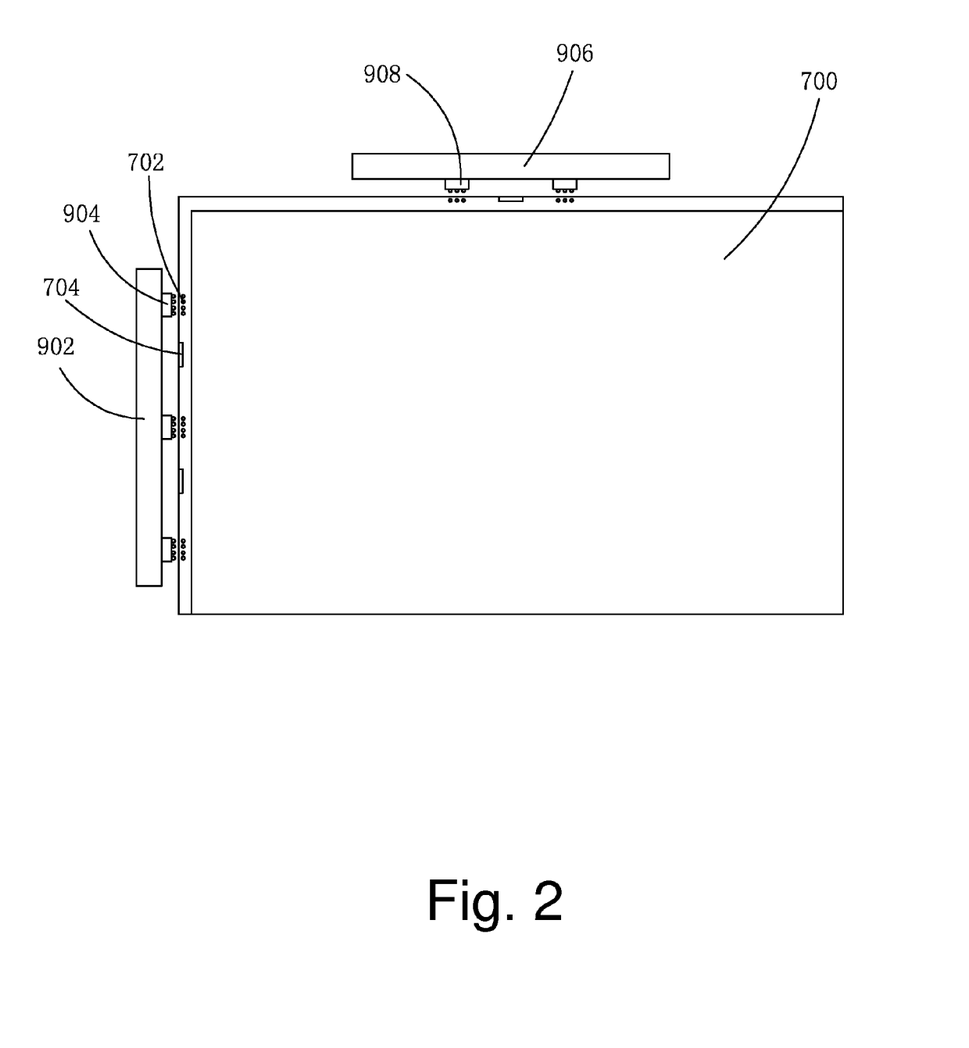
FIG. 2 is a diagram of a Shorting Bar light-on Inspection according to prior art.

Please refer to FIG. 2 which is a diagram of a Shorting Bar light-on Inspection according to prior art. Several shorting bar pads 702 and the bonding pads 704 are located at two adjacent sides of the liquid crystal display panel 700 for test. The Shorting Bar test means comprises a first test arm 902, a plurality of first contact probes 904 installed on the first test arm 902 and corresponding to the shorting bar pads 702, a second test arm 906, a plurality of second contact probes 908 installed on the second test arm 906 and corresponding to the shorting bar pads 702. In this example, three first contact probes 904 are installed on the first test arm 902, employed for transmitting gate signals to the liquid crystal display panel 700 for test. Two second contact probes 908 are installed on the second test arm 906, employed for transmitting data signals to the liquid crystal display panel 700 for test. Accordingly, the liquid crystal display panel 700 can display images.

Figure 3:
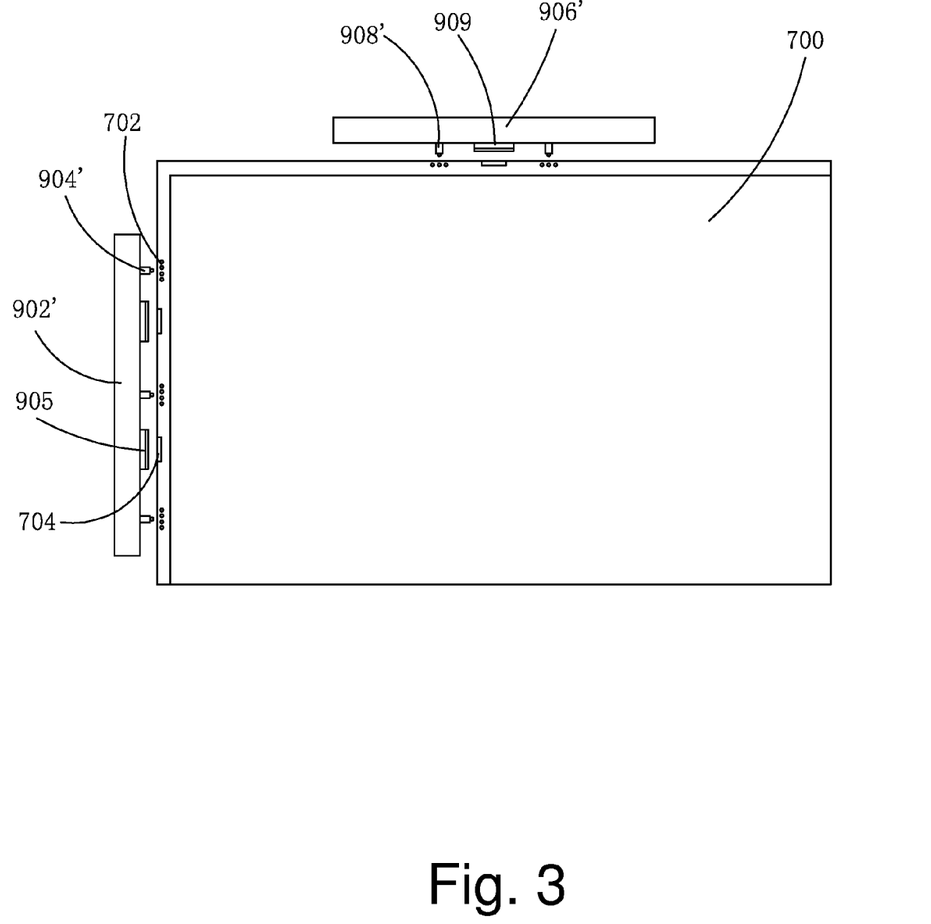
FIG. 3 is a diagram of a 1D1G light-on Inspection according to prior art.

Please refer to FIG. 3, which is a diagram of a 1D1G light-on Inspection according to prior art. The 1D1G test means comprises a first test arm 902', a plurality of first contact probes 904' installed on the first test arm 902' and corresponding to the shorting bar pads 702, a plurality of first conductors 905 installed on the first test arm 902' and corresponding to the bonding pads 704, a second test arm 906', a plurality of second contact probes 908'installed on the second test arm 906' and corresponding to the shorting bar pads 702, a plurality of second conductors 909 installed on the second test arm 906' and corresponding to the bonding pads 704. In this example, three first contact probes 904' and two first conductors 905 are installed on the first test arm 902', employed for transmitting gate signals to the liquid crystal display panel 700 for test. Two second contact probes 908' and one second conductor 909 are installed on the second test arm 906', employed for transmitting data signals to the liquid crystal display panel 700 for test. Accordingly, the liquid crystal display panel 700 can display images.

Obviously, the test means cannot be commonly utilized in the 1D1G light-on Inspection and the Shorting Bar light-on Inspection. When the light-on way is required to change, the test means will need to be replaced. The cease of the production is inevitable for the replacement of the test means. The production time is wasted and the production efficiency is decreased. Consequently, the production cost is increased.

SUMMARY OF THE INVENTION

An objective of the present invention is to provide an inspection instrument of a liquid crystal display panel which integrates Shorting Bar test means and 1D1G test means in one unit. A flexible switch can be realized to tremendously promote the production efficiency.

For realizing the aforesaid objective, the present invention provides an inspection instrument of the liquid crystal display panel, comprising an inspection equipment and an image generator electrically connected to the inspection equipment, and the inspection equipment comprises a main body, a first test arm and a second test arm which are installed on the main body and electrically connected to the image generator, a plurality of first contact probes and a plurality of second contact probes which are respectively installed on the first test arm and the second test arm, and a first bonding part and a second bonding part which are respectively and slidably installed on the first test arm and the second test arm, and the first contact probes and the second contact probes are electrically connected to the image generator, and first conductors and second conductors are respectively located on the first bonding part and the second bonding part, and the first conductors and the second conductors are electrically connected to the image generator, and the first conductors and the second conductors are positionally adjustable in the direction perpendicular to the liquid crystal display panel.

The first bonding part comprises a first base installed on the first test arm, a first adjustment means installed on the first base, a first install part located on the first adjustment means, and the first conductors are located on the first install part; the second bonding part comprises a second base installed on the second test arm, a second adjustment means installed on the second base, a second install part located on the second adjustment means, and the second conductors are located on the second install part.

The first adjustment means comprises a first adjustment block, a first horizontal adjustment screw located on the first adjustment block and a first vertical adjustment screw located on the first adjustment block; a first horizontal spring is positioned between the first adjustment block and the first install part, and the first horizontal adjustment screw penetrates the first install part and extends inside the first adjustment block; a first vertical spring is positioned between the first adjustment block and the first base, and the first vertical adjustment screw penetrates the first adjustment block and extends inside the first base; the second adjustment means comprises a second adjustment block, a second horizontal adjustment screw located on the second adjustment block and a second vertical adjustment screw located on the second adjustment block; a second horizontal spring is positioned between the second adjustment block and the second install part, and the second horizontal adjustment screw penetrates the second install part and extends inside the second adjustment block; a second vertical spring is positioned between the second adjustment block and the second base, and the second vertical adjustment screw penetrates the second adjustment block and extends inside the second base.

A first open and a second open are respectively located on the first install part and the second install part, and open ends of the first open and the second open are toward the liquid crystal display panel, and the first conductors and the second conductors are respectively installed in the first open and the second open and extend outside the first install part and the second install part from the first open and the second open.

The inspection instrument further comprises a first adapter plate and a second adapter plate which are electrically connected to the image generator, and the first contact probes of the first test arm and the first conductors of the first bonding part are electrically connected to the image generator via the first adapter plate; the second contact probes of the second test arm and the second conductors of the second bonding part are electrically connected to the image generator via the second adapter plate.

The image generator outputs gate signals via the first adapter plate; the image generator outputs data signals via the second adapter plate; the gate signals comprises gray level signals of red, green, blue, black and white; the data signals comprises gray level signals of black and white.

A first connector and a second connector are located on the first adapter plate, and the first contact probes comprise first terminals corresponding to the first connector, and the first conductors comprise second terminals corresponding to the second connector, and a third connector and a fourth connector are located on the second adapter plate, and the second contact probes comprise third terminals corresponding to the third connector, and the second conductors comprise fourth terminals corresponding to the fourth connector.

Both the first conductors and the second conductors comprise conductive adhesive and wires electrically connected to the conductive adhesive, and the second terminals and the fourth terminals are respectively located at ends of the wires of the first conductors and the second conductors away from the conductive adhesive.

The main body comprises an operating platform, employed for placing the liquid crystal display panel, and the first test arm and the second test arm are respectively positioned at two adjacent sides of the operating platform.

The first test arm and the second test arm comprise respective sliding tracks, and the first bonding part and the second bonding part comprise grooves and lock screws corresponding to the sliding tracks, and the first bonding part and the second bonding part slides on the sliding tracks with grooves and are located with the lock screws.

The present invention further provides an inspection instrument of the liquid crystal display panel, comprising: an inspection equipment and an image generator electrically connected to the inspection equipment, and the inspection equipment comprises a main body, a first test arm and a second test arm which are installed on the main body and electrically connected to the image generator, a plurality of first contact probes and a plurality of second contact probes which are respectively installed on the first test arm and the second test arm, and a first bonding part and a second bonding part which are respectively and slidably installed on the first test arm and the second test arm, and the first contact probes and the second contact probes are electrically connected to the image generator, and first conductors and second conductors are respectively located on the first bonding part and the second bonding part, and the first conductors and the second conductors are electrically connected to the image generator, and the first conductors and the second conductors are positionally adjustable in the direction perpendicular to the liquid crystal display panel;

wherein the first bonding part comprises a first base installed on the first test arm, a first adjustment means installed on the first base, a first install part located on the first adjustment means, and the first conductors are located on the first install part; the second bonding part comprises a second base installed on the second test arm, a second adjustment means installed on the second base, a second install part located on the second adjustment means, and the second conductors are located on the second install part;

wherein the first adjustment means comprises a first adjustment block, a first horizontal adjustment screw located on the first adjustment block and a first vertical adjustment screw located on the first adjustment block; a first horizontal spring is positioned between the first adjustment block and the first install part, and the first horizontal adjustment screw penetrates the first install part and extends inside the first adjustment block; a first vertical spring is positioned between the first adjustment block and the first base, and the first vertical adjustment screw penetrates the first adjustment block and extends inside the first base; the second adjustment means comprises a second adjustment block, a second horizontal adjustment screw located on the second adjustment block and a second vertical adjustment screw located on the second adjustment block; a second horizontal spring is positioned between the second adjustment block and the second install part, and the second horizontal adjustment screw penetrates the second install part and extends inside the second adjustment block; a second vertical spring is positioned between the second adjustment block and the second base, and the second vertical adjustment screw penetrates the second adjustment block and extends inside the second base;

wherein a first open and a second open are respectively located on the first install part and the second install part, and open ends of the first open and the second open are toward the liquid crystal display panel, and the first conductors and the second conductors are respectively installed in the first open and the second open and extend outside the first install part and the second install part from the first open and the second open;

the inspection instrument further comprises a first adapter plate and a second adapter plate which are electrically connected to the image generator, and the first contact probes of the first test arm and the first conductors of the first bonding part are electrically connected to the image generator via the first adapter plate; the second contact probes of the second test arm and the second conductors of the second bonding part are electrically connected to the image generator via the second adapter plate;

wherein the image generator outputs gate signals via the first adapter plate; the image generator outputs data signals via the second adapter plate; the gate signals comprises gray level signals of red, green, blue, black and white; the data signals comprises gray level signals of black and white;

wherein a first connector and a second connector are located on the first adapter plate, and the first contact probes comprise first terminals corresponding to the first connector, and the first conductors comprise second terminals corresponding to the second connector, and a third connector and a fourth connector are located on the second adapter plate, and the second contact probes comprise third terminals corresponding to the third connector, and the second conductors comprise fourth terminals corresponding to the fourth connector;

wherein both the first conductors and the second conductors comprise conductive adhesive and wires electrically connected to the conductive adhesive, and the second terminals and the fourth terminals are respectively located at ends of the wires of the first conductors and the second conductors away from the conductive adhesive;

wherein the main body comprises an operating platform, employed for placing the liquid crystal display panel, and the first test arm and the second test arm are respectively positioned at two adjacent sides of the operating platform;

wherein the first test arm and the second test arm comprise respective sliding tracks, and the first bonding part and the second bonding part comprise grooves and lock screws corresponding to the sliding tracks, and the first bonding part and the second bonding part slides on the sliding tracks with grooves and are located with the lock screws.

The benefits of the present invention are: in the inspection instrument of the liquid crystal display panel according to the present invention, by integrating the Shorting Bar test means and the 1D1G test means in one unit, the conductors of the bonding parts are positionally adjustable in the direction perpendicular to the liquid crystal display panel. When the Shorting Bar light-on Inspection is performed, the conductors are moved away from the liquid crystal display panel by adjusting the conductors of the bonding parts. Thus, only the contact probes of the test arms are electrically connected to the image generator and the shorting bar pads of the liquid crystal display panel. When the 1D1G light-on Inspection is performed, the conductors contact the bonding pads of the liquid crystal display panel by adjusting the conductors of the bonding parts. Thus, both the conductors of the bonding parts and the contact probes of the test arms are electrically connected to the image generator and the liquid crystal display panel. Merely the adjustment of the positions of the conductors of the bonding parts relative to the liquid crystal display panel is required to realize switching between Shorting Bar and 1D1G, the two types of light-on Inspection. The operation is convenient. The replacement of the test means used in the inspection instrument is not required. Cease of the production will not happen. The production time is saved and the production efficiency is promoted. Accordingly, the manufacture cost is reduced and the maintenance cost is also diminished because the purchased amount of the means is decreased and the component consumption due to the means replacement is effectively reduced.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution, as well as beneficial advantages, of the present invention will be apparent from the following detailed description of an embodiment of the present invention, with reference to the attached drawings.

In drawings.

DETAILED DESCRIPTION OF PREFERRED EMBODIMENTS

Embodiments of the present invention are described in detail with the technical matters, structural features, achieved objects, and effects with reference to the accompanying drawings as follows.

Figure 4:
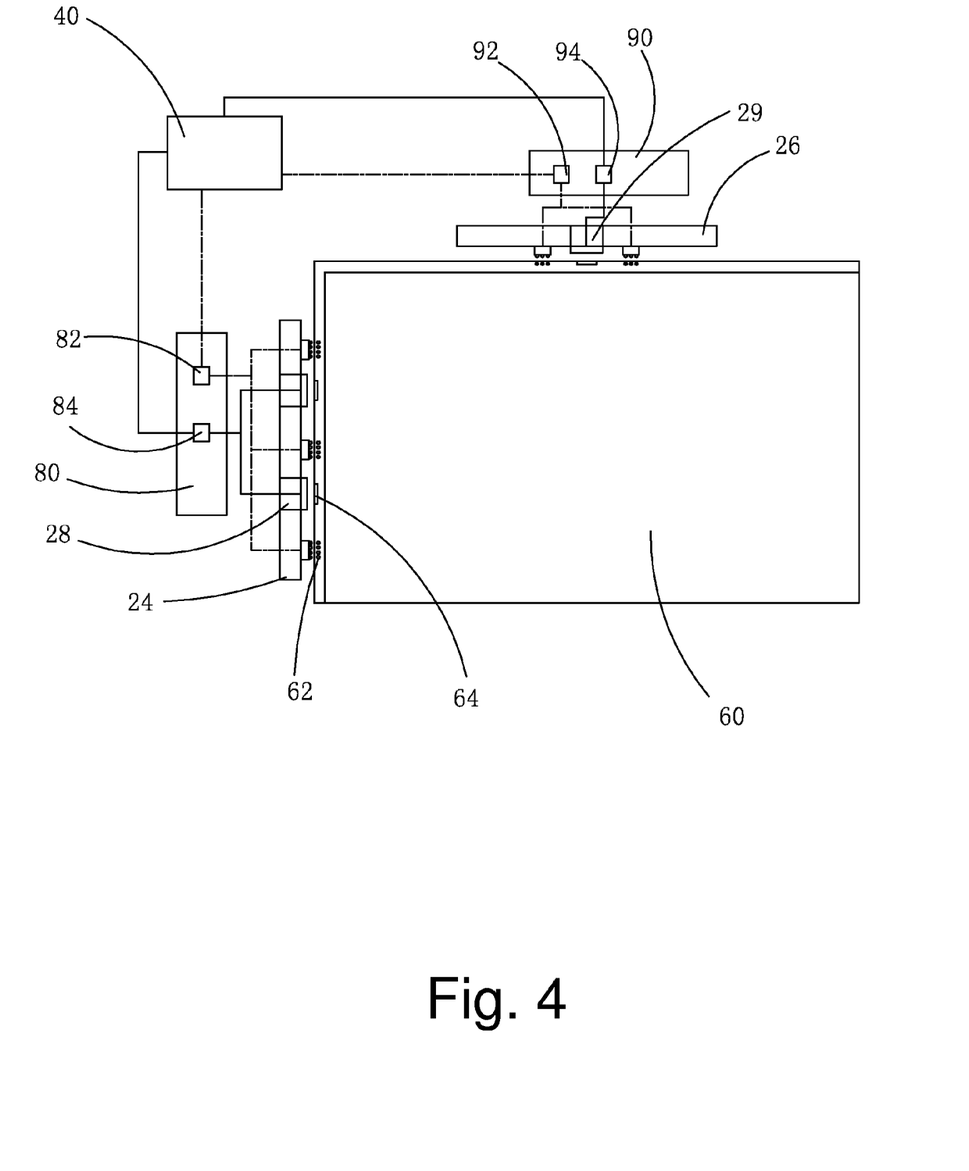
FIG. 4 is a diagram of an inspection instrument of a liquid crystal display panel in usage according to the present invention.
Figure 5:
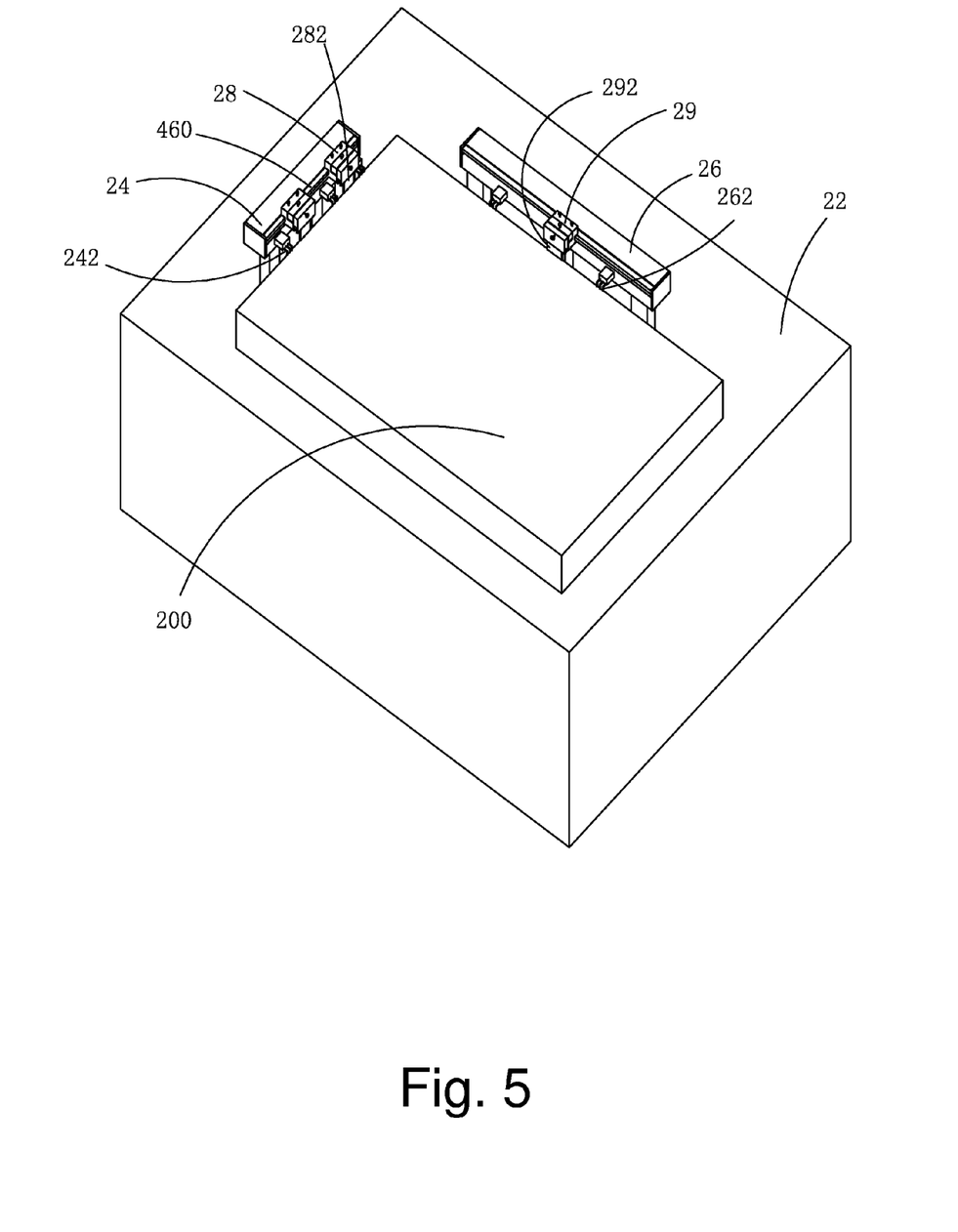
FIG. 5 is a stereo structural diagram of an inspection equipment in the inspection instrument of a liquid crystal display panel according to the present invention.

Please refer to FIG. 4 and FIG. 5. The present invention provides an inspection instrument of a liquid crystal display panel, comprising: an inspection equipment and an image generator 40 electrically connected to the inspection equipment, and the inspection equipment comprises a main body 22, a first test arm 24 and a second test arm 26 which are installed on the main body 22 and electrically connected to the image generator 40, a plurality of first contact probes 242 and a plurality of second contact probes 262 which are respectively installed on the first test arm 24 and the second test arm 26, and a first bonding part 28 and a second bonding part 29 which are respectively and slidably installed on the first test arm 24 and the second test arm 26, and the first contact probes 242 and the second contact probes 262 are electrically connected to the image generator 40, and first conductors 282 and second conductors 292 are respectively located on the first bonding part 28 and the second bonding part 29, and the first conductors 282 and the second conductors 292 are electrically connected to the image generator 40, and the first conductors 282 and the second conductors 292 are positionally adjustable in the direction perpendicular to the liquid crystal display panel 60.

The main body 22 comprises an operating platform 200, employed for placing the liquid crystal display panel 60, and the first test arm 24 and the second test arm 26 are respectively positioned at two adjacent sides of the operating platform 200. When the Shorting Bar light-on Inspection is performed, the first conductors 282 and the second conductors 292 of the first bonding part 28 and the second bonding part 29 are adjusted and moved away from the liquid crystal display panel 60. Thus, only the first contact probes 242 and the second contact probes 262 of the first test arm 24 and the second test arm 26 are electrically connected to the image generator 40 and the shorting bar pads 62 of the liquid crystal display panel 60. Open circuits are formed between the first conductors 282, the second conductors 292 and the bonding pads 64 of the liquid crystal display panel 60. The image generator 40 outputs gate signals via the first contact probes 242, and the gate signals comprises gray level signals of red, green, blue, black and white. The image generator 40 outputs data signals via the second contact probes 262, and the data signals comprises gray level signals of black and white. The liquid crystal display panel 60 displays the corresponding image driven by the gate signals and the data signals. The Inspector checks whether bad dots or light dots exist or not according to the image display. When the 1D1G light-on Inspection is performed, the first conductors 282 and the second conductors 292 contact the liquid crystal display panel 60 by adjusting the first conductors 282 and the second conductors 292 of the first bonding part 28 and the second bonding part 29. Thus, the first conductors 282, the second conductors 292 of the first bonding part 28, the second bonding part 29 and the first contact probes 242, the second contact probes 262 of the first test arm 24, the second test arm 26 are all electrically connected to the image generator 40 and the liquid crystal display panel 60. The image generator 40 outputs the gate signals to the liquid crystal display panel 60 via the first contact probes 242 and the first conductors 282 and outputs the data signals to the liquid crystal display panel 60 via the second contact probes 262 and the second conductors 292. The liquid crystal display panel 60 displays the corresponding image driven by the gate signals and the data signals. The Inspector checks the display status of the liquid crystal display panel 60 after the Shorting Bar is cut off according to the image display. Merely the adjustment of the positions of the first conductors 282, the second conductors 292 of the first bonding part 28, the second bonding part 29 relative to the liquid crystal display panel 60 is required to realize switching between Shorting Bar and 1D1G, the two types of light-on Inspection. The operation is convenient. Cease of the production will not happen. The production time is saved and the production efficiency is promoted.

Figure 6:
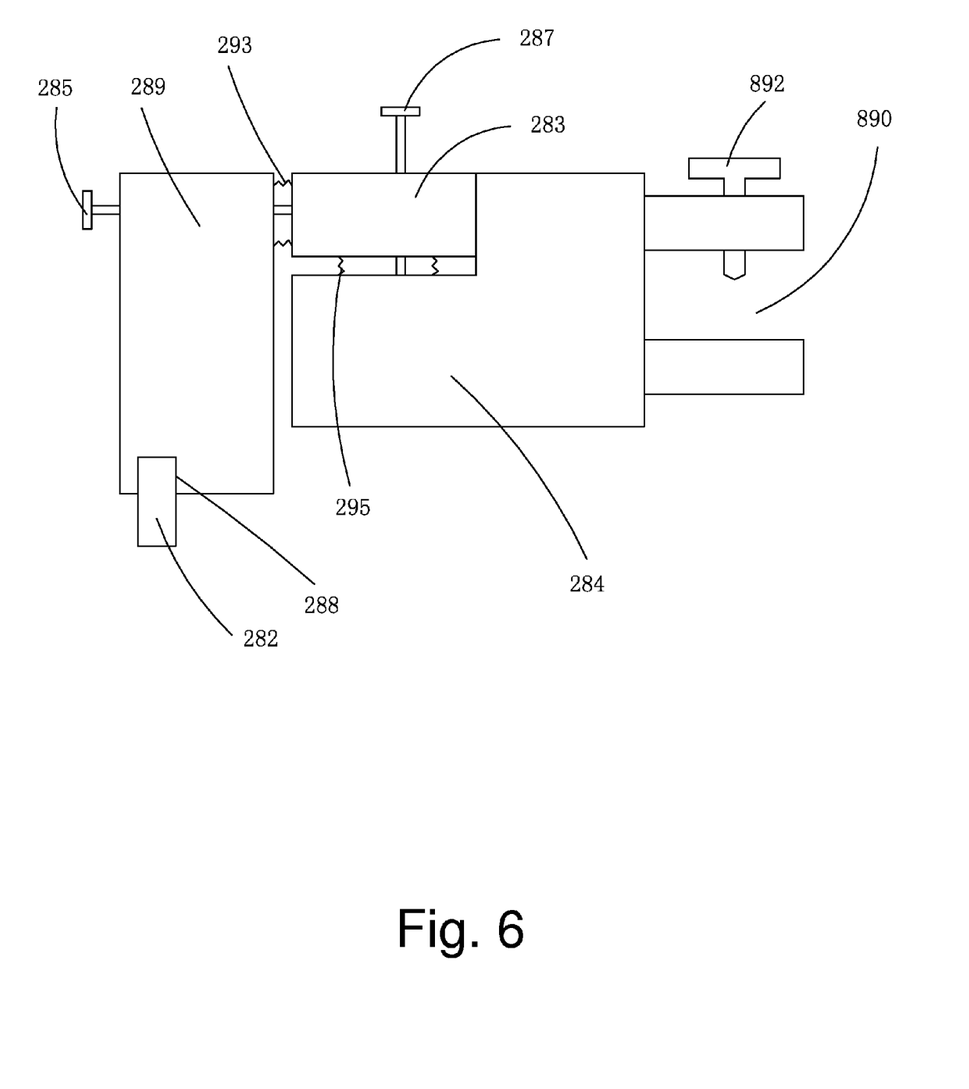
FIG. 6 is a front view diagram of a first bonding part in the inspection instrument of a liquid crystal display panel according to the present invention.
Figure 7:
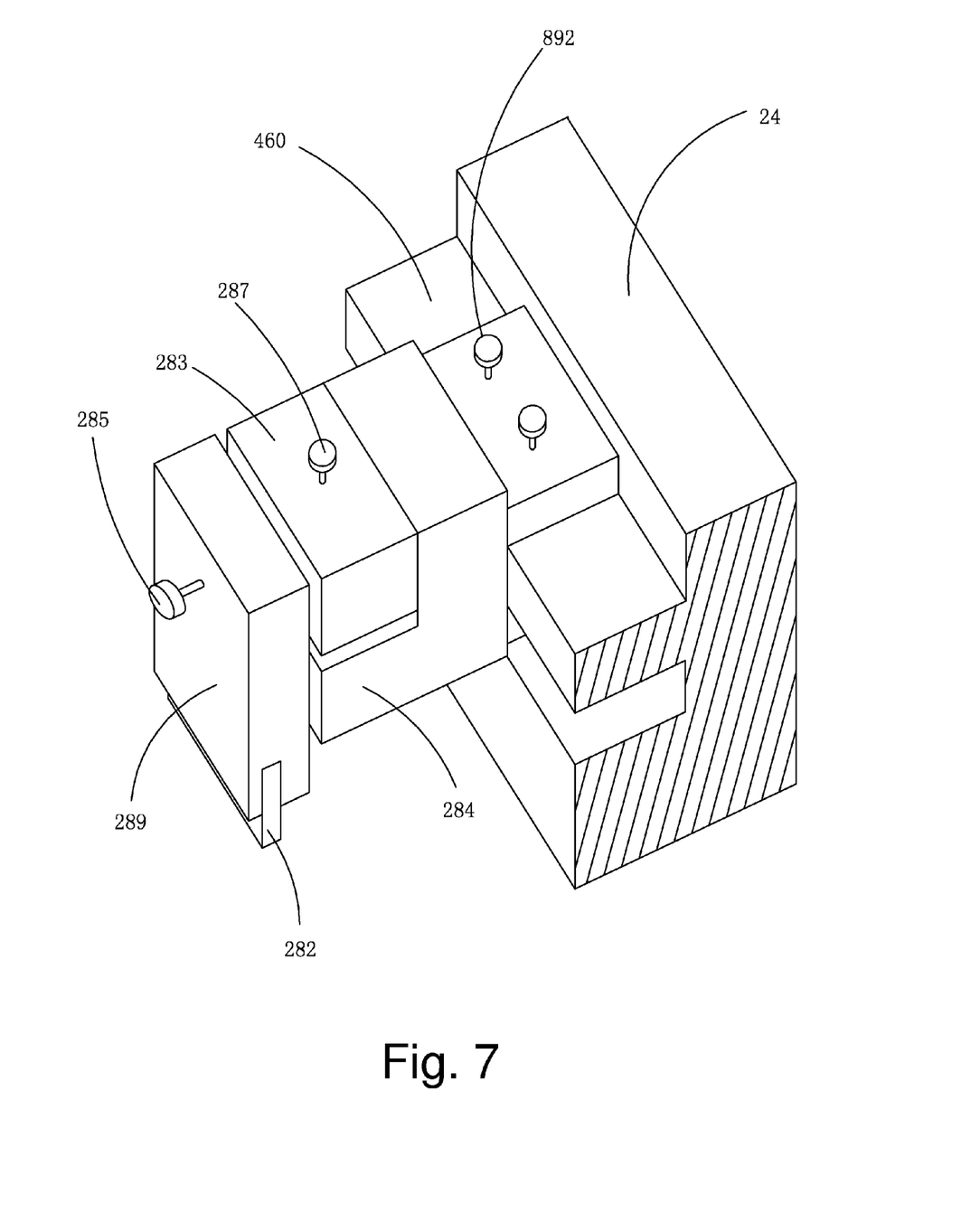
FIG. 7 is a stereo assembly diagram of the first bonding part and a first test arm in the inspection instrument of a liquid crystal display panel according to the present invention.
Figure 8:
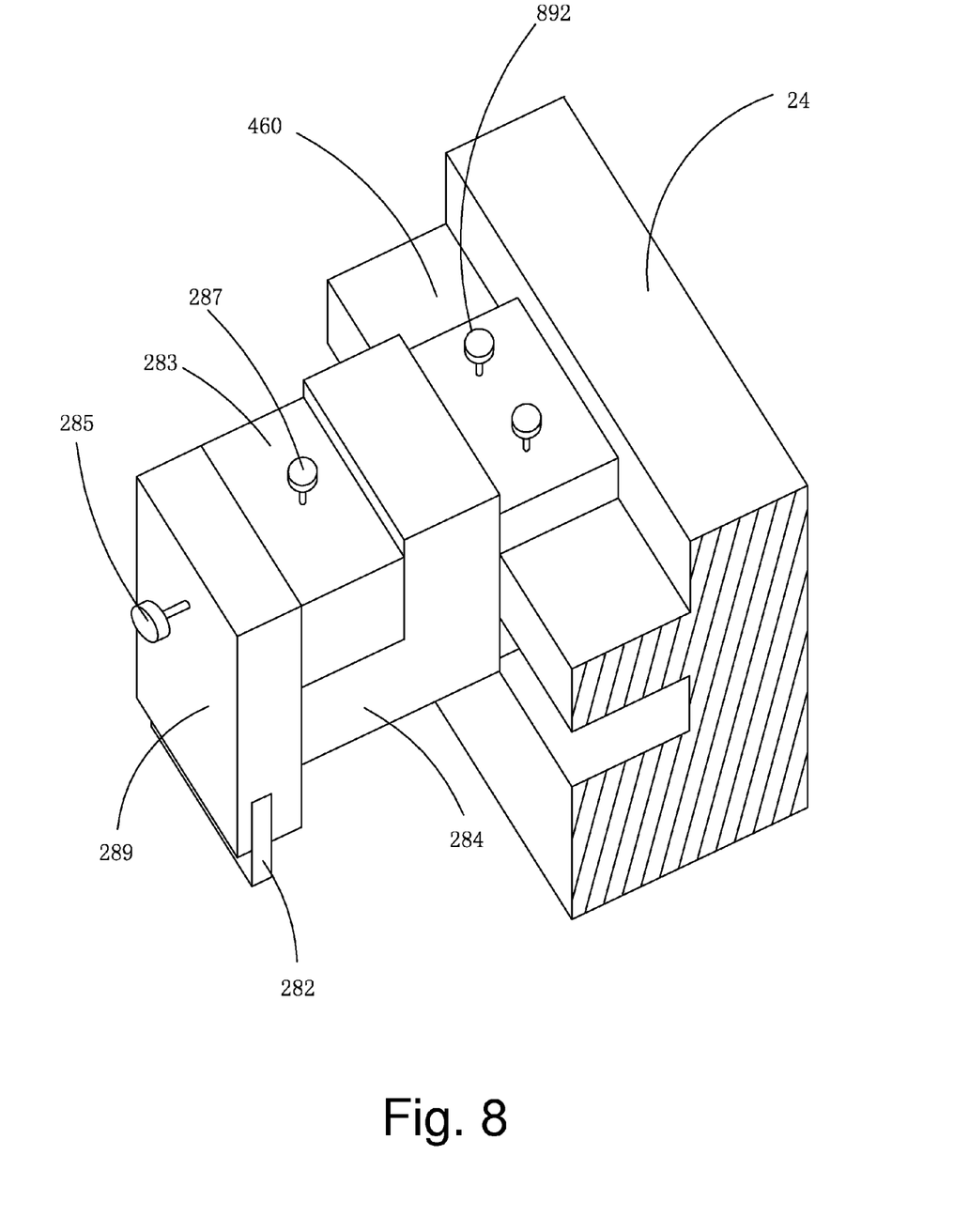
FIG. 8 is similar as FIG. 7 and depicts a stereo sectional diagram of first conductors after the horizontal and vertical adjustments.

Please refer from FIG. 6 to FIG. 8. In this embodiment, the first bonding part 28 comprises a first base 284 installed on the first test arm 24, a first adjustment means 286 installed on the first base 284, a first install part 289 located on the first adjustment means 286. The first conductors 282 are located on the first install part 289. The first adjustment means 286 is employed for adjusting the positions of the first conductors 282 relative to the liquid crystal display panel 60. Accordingly, the electric connection and the cut off between the first conductors 282 and the liquid crystal display panel 60 are adjusted.

Specifically, a first open 288 is formed and located on the first install part 289. The open end of the first open 288 is located toward the liquid crystal display panel 60. The first conductors 282 are installed in the first open 288 and extend outside the first install part 289 from the first open 288. The first adjustment means 286 comprises a first adjustment block 283, a first horizontal adjustment screw 285 located on the first adjustment block 283 and a first vertical adjustment screw 287 located on the first adjustment block 283; a first horizontal spring 293 is positioned between the first adjustment block 283 and the first install part 289, and the first horizontal adjustment screw 285 penetrates the first install part 289 and extends inside the first adjustment block 283.

Accordingly, the horizontal micro adjustment of the first conductors 282 installed inside the first install part 289 can be realized; a first vertical spring 295 is positioned between the first adjustment block 283 and the first base 284, and the first vertical adjustment screw 287 penetrates the first adjustment block 283 and extends inside the first base 284. Accordingly, the vertical micro adjustment of the first conductors 282 installed inside the first install part 289 can be realized.

The second bonding part 29 has the same structure and the functions. The repeated description is omitted here.

In this embodiment, both the first conductors 282 and the second conductors 292 comprise conductive adhesive and wires (not shown) electrically connected to the conductive adhesive. The conductive adhesive is employed for electric connection to the bonding pads 64 of the liquid crystal display panel 60. Because the conductive adhesive is elastic and can be properly deformed when the first adjustment means 286 and the second adjustment means 296 are adjusted and electrically connected to the bonding pads 64 of the liquid crystal display panel 60 to make more steady electric connections and effectively prevent false connections.

Please refer to FIG. 4. Moreover, the inspection instrument of the present invention further comprises a first adapter plate 80 and a second adapter plate 90 which are electrically connected to the image generator. The first contact probes 242 of the first test arm 24 of the main body 22 and the first conductors 282 of the first bonding part 28 are electrically connected to the image generator 40 via the first adapter plate 80; the second contact probes 262 of the second test arm 26 and the second conductors 292 of the second bonding part 29 are electrically connected to the image generator 40 via the second adapter plate 90. The image generator 40 outputs gate signals via the first adapter plate 80; the image generator 40 outputs data signals via the second adapter plate 90.

Preferably, a first connector 82 and a second connector 84 are located on the first adapter plate 80. The first contact probes 242 comprise first terminals (not shown) corresponding to the first connector 82. The wire ends of the first conductors 282 away from the conductive adhesive comprise second terminals (not shown) corresponding to the second connector 84. The first terminals and the second terminals are respectively plugged in the first connector 82 and the second connector 84 to allow the first contact probes 242 of the first test arm 24 and the first conductors 282 of the first bonding part 28 electrically connect to the image generator 40. A third connector 92 and a fourth connector 94 are located on the second adapter plate 90. The wire ends of the second conductors 292 away from the conductive adhesive comprise fourth terminals (not shown) corresponding to the fourth connector 94. The third terminals and the fourth terminals are respectively plugged in the third connector 92 and the fourth connector 94 to allow the second contact probes 262 of the second test arm 26 and the second conductors 292 of the second bonding part 29 electrically connect to the image generator 40. When the Shorting Bar light-on Inspection is performed, the second terminals and the fourth terminals can be pulled out from the second connector 84 and the fourth connector 94 to prevent signal interference. When the 1D1G light-on Inspection is performed, the first terminals, the second terminals, the third terminals and the fourth terminals are respectively and electrically connected to the first, the second the third and the fourth connectors 82, 84, 92, 94 for implementing the 1D1G light-on Inspection.

When the Shorting Bar light-on Inspection and the 1D1G light-on Inspection are sequentially performed with the inspection instrument of the liquid crystal display panel according to the present invention, the specific operations can be following steps:

First, the Shorting Bar light-on Inspection is performed:

step 1, placing the liquid crystal display panel 60 on the operating platform 200 of the equipment 20.

step 2, adjusting the first conductors 282 of the first bonding part 28 and the second conductors 292 of the second bonding part 29 toward the direction away from the liquid crystal display panel 60, and pulling out the second terminals, the fourth terminals from the second connector 84 and the fourth connector 94.

step 3, electrically connecting the first contact probes 242 and the second contact probes 262 of the first test arm 24 and the second test arm 26 to the shorting bar pads 62 of the liquid crystal display panel 60. Now, open circuits are formed between the image generator 40 and the bonding pad 64.

step 4, activating the image generator 40, and the image generator 40 outputs image signals. The liquid crystal display panel 60 displays images according to the image signals to realize the Shorting Bar light-on Inspection to the liquid crystal display panel 60.

step 5, shutting down the image generator 40 after the Shorting Bar light-on Inspection is accomplished and preparing the 1D1G light-on Inspection.

step 6, adjusting the first conductors 282 and the second conductors 292 of the first bonding part 28 and the second bonding part 29 toward the direction closing to the liquid crystal display panel 60 to electrically connect the first conductors 282 and the second conductors 292 of the first bonding part 28 and the second bonding part 29 to the bonding pads 64. Meanwhile, the second terminals and the fourth terminals are plugged in the second connector 84 and the fourth connector 94. At this moment, the image generator 40 is electrically connected to the shorting bar pads 62 and the bonding pads 64 at the same time.

step 7, activating the image generator 40, and the image generator 40 outputs image signals. The liquid crystal display panel 60 displays images according to the image signals to realize the 1D1G light-on Inspection to the liquid crystal display panel 60.

Significantly, in the aforesaid specific operations, the step 2 and the step 3 can be switch in orders. The skill result still can be achieved.

Furthermore, in this embodiment (as shown in FIG. 5), the first test arm 24 and the second test arm 26 further comprise respective sliding tracks 460. The first bonding part 28 and the second bonding part 29 comprise grooves 890 and lock screws 892 corresponding to the sliding tracks 460. The first bonding part 28 and the second bonding part 29 slides on the sliding tracks 460 with grooves 890 and are located with the lock screws 892. Accordingly, the horizontal positions of the first bonding part 28 and the second bonding part 29 relative to the first test arm 24 and the second test arm 26 can be adjusted to adapt to inspections of liquid crystal display panel 60 having different dimensions.

In conclusion, in the inspection instrument of the liquid crystal display panel according to the present invention, by integrating the Shorting Bar test means and the 1D1G test means in one unit, the conductors of the bonding parts are positionally adjustable in the direction perpendicular to the liquid crystal display panel. When the Shorting Bar light-on Inspection is performed, the conductors are moved away from the liquid crystal display panel by adjusting the conductors of the bonding parts. Thus, only the contact probes of the test arms are electrically connected to the image generator and the shorting bar pads of the liquid crystal display panel. When the 1D1G light-on Inspection is performed, the conductors contact the bonding pads of the liquid crystal display panel by adjusting the conductors of the bonding parts. Thus, both the conductors of the bonding parts and the contact probes of the test arms are electrically connected to the image generator and the liquid crystal display panel. Merely the adjustment of the positions of the conductors of the bonding parts relative to the liquid crystal display panel is required to realize switching between Shorting Bar and 1D1G, the two types of light-on Inspection. The operation is convenient. The replacement of the test means used in the inspection instrument is not required. Cease of the production will not happen. The production time is saved and the production efficiency is promoted. Accordingly, the manufacture cost is reduced and the maintenance cost is also diminished because the purchased amount of the means is decreased and the component consumption due to the means replacement is effectively reduced.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. An inspection instrument of a liquid crystal display panel, comprising an inspection equipment and an image generator electrically connected to the inspection equipment, and the inspection equipment comprises a main body, a first test arm and a second test arm which are installed on the main body and electrically connected to the image generator, a plurality of first contact probes and a plurality of second contact probes which are respectively installed on the first test arm and the second test arm, and a first bonding part and a second bonding part which are respectively and slidably installed on the first test arm and the second test arm, and the first contact probes and the second contact probes are electrically connected to the image generator, and first conductors and second conductors are respectively located on the first bonding part and the second bonding part, and the first conductors and the second conductors are electrically connected to the image generator, and the first conductors and the second conductors are positionally adjustable in the direction perpendicular to the liquid crystal display panel;

wherein the first bonding part comprises a first base installed on the first test arm, a first adjustment means installed on the first base, a first install part located on the first adjustment means, and the first conductors are located on the first install part; the second bonding part comprises a second base installed on the second test arm, a second adjustment means installed on the second base, a second install part located on the second adjustment means, and the second conductors are located on the second install part.

2. The inspection instrument of the liquid crystal display panel according to claim 1, wherein the first adjustment means comprises a first adjustment block, a first horizontal adjustment screw located on the first adjustment block and a first vertical adjustment screw located on the first adjustment block; a first horizontal spring is positioned between the first adjustment block and the first install part, and the first horizontal adjustment screw penetrates the first install part and extends inside the first adjustment block; a first vertical spring is positioned between the first adjustment block and the first base, and the first vertical adjustment screw penetrates the first adjustment block and extends inside the first base; the second adjustment means comprises a second adjustment block, a second horizontal adjustment screw located on the second adjustment block and a second vertical adjustment screw located on the second adjustment block; a second horizontal spring is positioned between the second adjustment block and the second install part, and the second horizontal adjustment screw penetrates the second install part and extends inside the second adjustment block; a second vertical spring is positioned between the second adjustment block and the second base, and the second vertical adjustment screw penetrates the second adjustment block and extends inside the second base.

3. The inspection instrument of the liquid crystal display panel according to claim 1, wherein a first open and a second open are respectively located on the first install part and the second install part, and open ends of the first open and the second open are toward the liquid crystal display panel, and the first conductors and the second conductors are respectively installed in the first open and the second open and extend outside the first install part and the second install part from the first open and the second open.

4. The inspection instrument of the liquid crystal display panel according to claim 1, further comprising a first adapter plate and a second adapter plate which are electrically connected to the image generator, and the first contact probes of the first test arm and the first conductors of the first bonding part are electrically connected to the image generator via the first adapter plate; the second contact probes of the second test arm and the second conductors of the second bonding part are electrically connected to the image generator via the second adapter plate.

5. The inspection instrument of the liquid crystal display panel according to claim 4, wherein the image generator outputs gate signals via the first adapter plate; the image generator outputs data signals via the second adapter plate; the gate signals comprises gray level signals of red, green, blue, black and white; the data signals comprises gray level signals of black and white.

6. The inspection instrument of the liquid crystal display panel according to claim 4, wherein a first connector and a second connector are located on the first adapter plate, and the first contact probes comprise first terminals corresponding to the first connector, and the first conductors comprise second terminals corresponding to the second connector, and a third connector and a fourth connector are located on the second adapter plate, and the second contact probes comprise third terminals corresponding to the third connector, and the second conductors comprise fourth terminals corresponding to the fourth connector.

7. The inspection instrument of the liquid crystal display panel according to claim 6, wherein both the first conductors and the second conductors comprise conductive adhesive and wires electrically connected to the conductive adhesive, and the second terminals and the fourth terminals are respectively located at ends of the wires of the first conductors and the second conductors away from the conductive adhesive.

8. The inspection instrument of the liquid crystal display panel according to claim 1, wherein the main body comprises an operating platform, employed for placing the liquid crystal display panel, and the first test arm and the second test arm are respectively positioned at two adjacent sides of the operating platform.

9. The inspection instrument of the liquid crystal display panel according to claim 1, wherein the first test arm and the second test arm comprise respective sliding tracks, and the first bonding part and the second bonding part comprise grooves and lock screws corresponding to the sliding tracks, and the first bonding part and the second bonding part slides on the sliding tracks with grooves and are located with the lock screws.

10. The inspection instrument of the liquid crystal display panel according to claim 1, wherein the main body comprises an operating platform, employed for placing the liquid crystal display panel, and the first test arm and the second test arm are respectively positioned at two adjacent sides of the operating platform.

11. The inspection instrument of the liquid crystal display panel according to claim 1, wherein the first test arm and the second test arm comprise respective sliding tracks, and the first bonding part and the second bonding part comprise grooves and lock screws corresponding to the sliding tracks, and the first bonding part and the second bonding part slides on the sliding tracks with grooves and are located with the lock screws.

12. An inspection instrument of a liquid crystal display panel, comprising an inspection equipment and an image generator electrically connected to the inspection equipment, and the inspection equipment comprises a main body, a first test arm and a second test arm which are installed on the main body and electrically connected to the image generator, a plurality of first contact probes and a plurality of second contact probes which are respectively installed on the first test arm and the second test arm, and a first bonding part and a second bonding part which are respectively and slidably installed on the first test arm and the second test arm, and the first contact probes and the second contact probes are electrically connected to the image generator, and first conductors and second conductors are respectively located on the first bonding part and the second bonding part, and the first conductors and the second conductors are electrically connected to the image generator, and the first conductors and the second conductors are positionally adjustable in the direction perpendicular to the liquid crystal display panel;

wherein the first bonding part comprises a first base installed on the first test arm, a first adjustment means installed on the first base, a first install part located on the first adjustment means, and the first conductors are located on the first install part; the second bonding part comprises a second base installed on the second test arm, a second adjustment means installed on the second base, a second install part located on the second adjustment means, and the second conductors are located on the second install part;

wherein the first adjustment means comprises a first adjustment block, a first horizontal adjustment screw located on the first adjustment block and a first vertical adjustment screw located on the first adjustment block; a first horizontal spring is positioned between the first adjustment block and the first install part, and the first horizontal adjustment screw penetrates the first install part and extends inside the first adjustment block; a first vertical spring is positioned between the first adjustment block and the first base, and the first vertical adjustment screw penetrates the first adjustment block and extends inside the first base; the second adjustment means comprises a second adjustment block, a second horizontal adjustment screw located on the second adjustment block and a second vertical adjustment screw located on the second adjustment block; a second horizontal spring is positioned between the second adjustment block and the second install part, and the second horizontal adjustment screw penetrates the second install part and extends inside the second adjustment block; a second vertical spring is positioned between the second adjustment block and the second base, and the second vertical adjustment screw penetrates the second adjustment block and extends inside the second base;

wherein a first open and a second open are respectively located on the first install part and the second install part, and open ends of the first open and the second open are toward the liquid crystal display panel, and the first conductors and the second conductors are respectively installed in the first open and the second open and extend outside the first install part and the second install part from the first open and the second open;

the inspection instrument further comprises a first adapter plate and a second adapter plate which are electrically connected to the image generator, and the first contact probes of the first test arm and the first conductors of the first bonding part are electrically connected to the image generator via the first adapter plate; the second contact probes of the second test arm and the second conductors of the second bonding part are electrically connected to the image generator via the second adapter plate;

wherein the image generator outputs gate signals via the first adapter plate; the image generator outputs data signals via the second adapter plate; the gate signals comprises gray level signals of red, green, blue, black and white; the data signals comprises gray level signals of black and white;

wherein a first connector and a second connector are located on the first adapter plate, and the first contact probes comprise first terminals corresponding to the first connector, and the first conductors comprise second terminals corresponding to the second connector, and a third connector and a fourth connector are located on the second adapter plate, and the second contact probes comprise third terminals corresponding to the third connector, and the second conductors comprise fourth terminals corresponding to the fourth connector;

wherein both the first conductors and the second conductors comprise conductive adhesive and wires electrically connected to the conductive adhesive, and the second terminals and the fourth terminals are respectively located at ends of the wires of the first conductors and the second conductors away from the conductive adhesive;

wherein the main body comprises an operating platform, employed for placing the liquid crystal display panel, and the first test arm and the second test arm are respectively positioned at two adjacent sides of the operating platform;

wherein the first test arm and the second test arm comprise respective sliding tracks, and the first bonding part and the second bonding part comprise grooves and lock screws corresponding to the sliding tracks, and the first bonding part and the second bonding part slides on the sliding tracks with grooves and are located with the lock screws.

13. An inspection instrument of a liquid crystal display panel, comprising an inspection equipment and an image generator electrically connected to the inspection equipment, and the inspection equipment comprises a main body, a first test arm and a second test arm which are installed on the main body and electrically connected to the image generator, a plurality of first contact probes and a plurality of second contact probes which are respectively installed on the first test arm and the second test arm, and a first bonding part and a second bonding part which are respectively and slidably installed on the first test arm and the second test arm, and the first contact probes and the second contact probes are electrically connected to the image generator, and first conductors and second conductors are respectively located on the first bonding part and the second bonding part, and the first conductors and the second conductors are electrically connected to the image generator, and the first conductors and the second conductors are positionally adjustable in the direction perpendicular to the liquid crystal display panel;

further comprising a first adapter plate and a second adapter plate which are electrically connected to the image generator, and the first contact probes of the first test arm and the first conductors of the first bonding part are electrically connected to the image generator via the first adapter plate; the second contact probes of the second test arm and the second conductors of the second bonding part are electrically connected to the image generator via the second adapter plate;

wherein a first connector and a second connector are located on the first adapter plate, and the first contact probes comprise first terminals corresponding to the first connector, and the first conductors comprise second terminals corresponding to the second connector, and a third connector and a fourth connector are located on the second adapter plate, and the second contact probes comprise third terminals corresponding to the third connector, and the second conductors comprise fourth terminals corresponding to the fourth connector.

14. The inspection instrument of the liquid crystal display panel according to claim 13, wherein both the first conductors and the second conductors comprise conductive adhesive and wires electrically connected to the conductive adhesive, and the second terminals and the fourth terminals are respectively located at ends of the wires of the first conductors and the second conductors away from the conductive adhesive.

15. The inspection instrument of the liquid crystal display panel according to claim 13, wherein the first bonding part comprises a first base installed on the first test arm, a first adjustment means installed on the first base, a first install part located on the first adjustment means, and the first conductors are located on the first install part; the second bonding part comprises a second base installed on the second test arm, a second adjustment means installed on the second base, a second install part located on the second adjustment means, and the second conductors are located on the second install part; and wherein the first adjustment means comprises a first adjustment block, a first horizontal adjustment screw located on the first adjustment block and a first vertical adjustment screw located on the first adjustment block; a first horizontal spring is positioned between the first adjustment block and the first install part, and the first horizontal adjustment screw penetrates the first install part and extends inside the first adjustment block; a first vertical spring is positioned between the first adjustment block and the first base, and the first vertical adjustment screw penetrates the first adjustment block and extends inside the first base; the second adjustment means comprises a second adjustment block, a second horizontal adjustment screw located on the second adjustment block and a second vertical adjustment screw located on the second adjustment block; a second horizontal spring is positioned between the second adjustment block and the second install part, and the second horizontal adjustment screw penetrates the second install part and extends inside the second adjustment block; a second vertical spring is positioned between the second adjustment block and the second base, and the second vertical adjustment screw penetrates the second adjustment block and extends inside the second base.

16. The inspection instrument of the liquid crystal display panel according to claim 15, wherein a first open and a second open are respectively located on the first install part and the second install part, and open ends of the first open and the second open are toward the liquid crystal display panel, and the first conductors and the second conductors are respectively installed in the first open and the second open and extend outside the first install part and the second install part from the first open and the second open.

17. The inspection instrument of the liquid crystal display panel according to claim 13, wherein the image generator outputs gate signals via the first adapter plate; the image generator outputs data signals via the second adapter plate; the gate signals comprises gray level signals of red, green, blue, black and white; the data signals comprises gray level signals of black and white.

* * * * *